US006854966B2

(12) United States Patent
Chutich et al.

(10) Patent No.: US 6,854,966 B2
(45) Date of Patent: Feb. 15, 2005

(54) APPARATUS AND METHOD FOR ADDING A COLORING AGENT TO A MATERIAL FOR BRICK MAKING

(75) Inventors: Mark W. Chutich, Austin, TX (US); Douglas Leon Prince, Austin, TX (US); James W. Krueger, Austin, TX (US); Steven K. Hitt, Bastrop, TX (US)

(73) Assignee: Acme Brick Company, Fort, TX (US)

( * ) Notice: Subject to any disclaimer, the term of this patent is extended or adjusted under 35 U.S.C. 154(b) by 110 days.

(21) Appl. No.: 10/072,007

(22) Filed: Feb. 7, 2002

(65) Prior Publication Data

US 2003/0146534 A1 Aug. 7, 2003

(51) Int. Cl.$^{7}$ ................................................ B29C 31/06

(52) U.S. Cl. ........................... 425/145; 366/17; 366/65; 425/256; 425/261; 425/311

(58) Field of Search ........................... 366/17, 65, 76.2, 366/76.6, 76.93, 79; 425/145, 311, 256, 261

(56) References Cited

U.S. PATENT DOCUMENTS 145,345 A 12/1873 Hall ............................ 264/73
970,870 A * 9/1910 Alexander .................... 366/65
1,159,878 A 11/1915 Thomas ........................ 264/73
1,200,489 A 10/1916 Grumman .................... 264/73
1,783,287 A 12/1930 Hilgendorf .................. 425/380
1,827,759 A * 10/1931 Miller ........................ 264/310
2,460,605 A 2/1949 Soissa .......................... 222/14
2,694,224 A * 11/1954 Rhodes ........................ 366/79
3,425,105 A * 2/1969 Gulde ........................ 425/130
3,528,131 A 9/1970 Duggins ..................... 425/145
3,706,825 A * 12/1972 Hall et al. ..................... 264/75
3,715,420 A 2/1973 Kiyono et al. .............. 264/171
3,799,716 A * 3/1974 Salts .......................... 425/104
3,832,431 A 8/1974 Matthaci ...................... 264/75
3,924,836 A * 12/1975 Bruning et al. ............ 366/76.6
3,939,238 A 2/1976 Salts ........................... 264/71
4,035,128 A 7/1977 Drostholm et al. ......... 425/259
4,094,941 A 6/1978 Manners et al. .............. 264/71
4,178,340 A 12/1979 Hyytinen ..................... 264/73
4,225,247 A * 9/1980 Hodson ........................ 366/40
4,229,156 A 10/1980 Hyytinen .................... 425/145
4,259,277 A 3/1981 Hill ............................. 264/75
4,368,984 A * 1/1983 Rikker ......................... 366/15
4,684,488 A * 8/1987 Rudolph ..................... 264/411
4,728,475 A 3/1988 Beck .......................... 264/211
5,110,521 A * 5/1992 Moller ...................... 264/40.4
5,225,210 A * 7/1993 Shimoda ..................... 425/145
5,612,064 A 3/1997 Kosman ..................... 425/255
5,723,517 A * 3/1998 Campo et al. .............. 523/303
5,948,449 A 9/1999 Chen .......................... 425/198
6,129,872 A 10/2000 Jang ............................ 264/75
6,540,502 B2 * 4/2003 Butler ........................ 425/261
6,582,216 B2 * 6/2003 Kosman ..................... 425/261

* cited by examiner

*Primary Examiner*—Robert B. Davis
(74) *Attorney, Agent, or Firm*—Sidley Austin Brown & Wood LLP

(57) ABSTRACT

An apparatus for adding a coloring agent to a material used to manufacture brick includes an extrusion container having an opening defined in the sidewall thereof. A coloring agent supply communicates with the opening for delivery of the coloring agent to the interior of the container as brick making material passes through the container. A storage device stores the coloring agent supply amount data corresponding to a supply amount for each of a plurality of brick types, each of the plurality of brick types having a different appearance. A controller is adapted to control a supply of a coloring agent from said coloring agent supply into said extrusion container in accordance with a selected brick type. A computer can be connected to the controller for data transfer. Accordingly, the computer can be used as an interface between a user and the apparatus.

35 Claims, 4 Drawing Sheets

APPARATUS AND METHOD FOR ADDING A COLORING AGENT TO A MATERIAL FOR BRICK MAKING

FIELD OF THE INVENTION

The present invention relates to a device and method for adding a coloring agent to a material that is used to make bricks.

BACKGROUND OF THE INVENTION

Conventional processes for forming bricks include a process wherein extruded clay slugs are coated with a layer of sand, deposited into mold boxes, then dried and heated until hardened. This process is a mechanical imitation of an ancient manner in which bricks were hand made, and is used to create a brick with a specific appearance.

In the process described above, wet clay passes through a conical funnel, which uses an auger to move the clay through what is, in most cases, a vertical extruder. Clay is ejected from the funnel at a predetermined rate, and a wire is used to cut a predetermined amount of the clay from the discharge outlet of the funnel. The portion of clay that is discharged from the funnel and cut by the wire, called a slug, is coated with a layer of sand, then deposited into a mold box, which is generally in the shape of the desired brick. Thereafter, the clay is removed from the mold box, dried, and heated to a finished state.

Because of the demand for bricks of varying colors and textures, a common technique is to color the sand that is used to coat the clay slug that is ejected from the extruder in order to produce bricks having different colors. However, not only are the possible color combinations limited with the above-described method, in some instances, the sand does not adhere to the surface of the brick, and thus the color of the brick is not effectively altered. This makes the process very unreliable and the appearance of the resulting brick non-uniform.

Further, because the process of changing from making a brick having one color to a brick having a different color is labor intensive, bricks having a single color have to be mass produced in very large quantities for the operation to be cost effective. For example, one unit containing a large number of bricks of a single color is first produced, then another unit containing a large number of bricks of one color that is different from the previous runs are produced separately. Thus, if it is desired to have a single unit of bricks containing bricks of several different colors, it is necessary to resort the bricks to combine the different colors. Alternatively, several pallets, with each pallet containing bricks of a single color, could be delivered to a job site for resorting by hand during the installation process. However, resorting by hand greatly slows the installation process.

Further, the method of imparting a color change to bricks with the method described above creates problems when it becomes necessary to repeat or reproduce a previously produced brick having a specific appearance. In particular, because of the unreliability of the sand adhering to the brick, the chances of reproducing a brick having a color matching that of a previously produced brick are small.

Other methods of coloring the brick have included the addition of colorants to the outer portion of the body of the bricks, and submerging columns of clay, or bricks, in a liquid base dye. However, these methods are expensive, and color reproducibility is very difficult. Moreover, these methods are also very limited in the amount of color variations that can be achieved, and again, it becomes very difficult to manufacture a combination of different colors simultaneously.

Further still, the methods discussed above relating to the conventional ways in which a color is added to a brick require additional and wholly separate processes to be performed on the clay, apart from the structural fabrication of the brick. This translates to additional cost and expense for new work stations on the production line and in additional steps in an assembly line manufacturing setting, where most brick manufacturing is generally performed, thus increasing the cost of manufacturing.

SUMMARY OF THE INVENTION

The present invention provides a device and a method that is capable of reliably adding color to a brick such that a brick having a desired appearance can be reproduced with improved accuracy. Further, the present invention simplifies the hardware necessary for coloration by providing a device that incorporates a coloring agent supply system with a pre-existing portion of the extruding process. Thus, the cost of implementing the device and method of the present invention is minimized because it is not necessary to create or add new facilities or work stations. Still further, the present invention provides a device that is capable of producing bricks of different colors within a single production run.

According to one aspect of the invention, the above objectives are achieved by providing a device which adds a coloring agent to a material that is used for making a brick, for example, a clay mixture, before the material is coated with a layer of sand and deposited into a mold box, and subsequently heat treated.

According to another aspect of the present invention, an apparatus for adding a coloring agent to material for manufacturing a brick comprises a container for extruding a material for forming bricks having a hole defined in a sidewall thereof, a coloring agent supply having an outlet port adapted to open into the container through the hole in the sidewall of the container, a storage device for storing a coloring agent supply amount data corresponding to a supply amount for each of a plurality of brick types, each of the plurality of brick types having a different appearance, and a controller for controlling a supply of a coloring agent from the coloring agent supply into the container in accordance with a selected brick type.

In another aspect of the invention, an apparatus for adding a coloring agent to material for manufacturing a brick comprises a container for extruding a material for forming bricks, the container having a hole defined in a sidewall thereof, a coloring agent supply having an outlet port adapted to open into the container through the hole in the sidewall of the container, a sensor for sensing a condition of at least a portion of the coloring agent supply and outputting a result, a storage device for storing a coloring agent supply amount data corresponding to a supply amount for each of a plurality of brick types, each of the plurality of brick types having a different appearance, and a controller for determining an operational condition of the coloring agent supply based on an output of the sensor, and controlling a supply of a coloring agent into the container in accordance with a selected brick type.

In a still further aspect, the present invention relates to a method of adding a coloring agent to material for brick making comprising the steps of providing a container which receives and discharges a material for making a brick, the container having a hole defined in a sidewall thereof, and supplying a coloring agent to the container via the hole in the sidewall of the container. Further, the method can include a step for storing a coloring agent supply amount corresponding to a supply amount for each of a plurality of brick types, wherein each of the brick types has a different appearance, wherein the step of supplying a coloring agent to the container via the hole in the sidewall of the container is performed in accordance with a coloring agent supply amount corresponding to a selected brick type.

BRIEF DESCRIPTION OF THE DRAWINGS

Other advantages and features of the invention will become more apparent with reference to the following detailed description of the presently preferred embodiment thereof in connection with the accompanying drawings, wherein like reference numerals have been applied to like elements, in which.

DETAILED DESCRIPTION OF THE DRAWINGS

Figure 1:
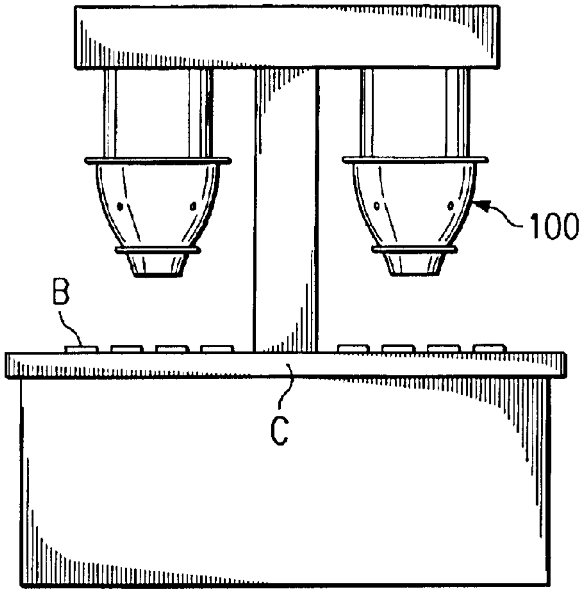
FIG. 1 is a view of a container in a brick manufacturing environment according to one embodiment of the invention.

Referring now to the drawings, FIG. 1 of the present invention depicts a structure defined by container 100 in an environment of a brick manufacturing system. In general, container 100 is an extruder that is positioned to receive a clay mixture, and output a column of clay, which is cut into slugs of a predetermined size, and deposited into a waiting mold box B that is being transported on a moving conveyor C below. Container 100 can be equipped with an auger (not shown) positioned in an interior position of container 100 to ensure that a uniform mixture is extruded from container 100. Notably, while the depiction of FIG. 1 is of a vertical extrusion process, the orientation of the extrusion is not limited to a vertical process.

Figure 2:
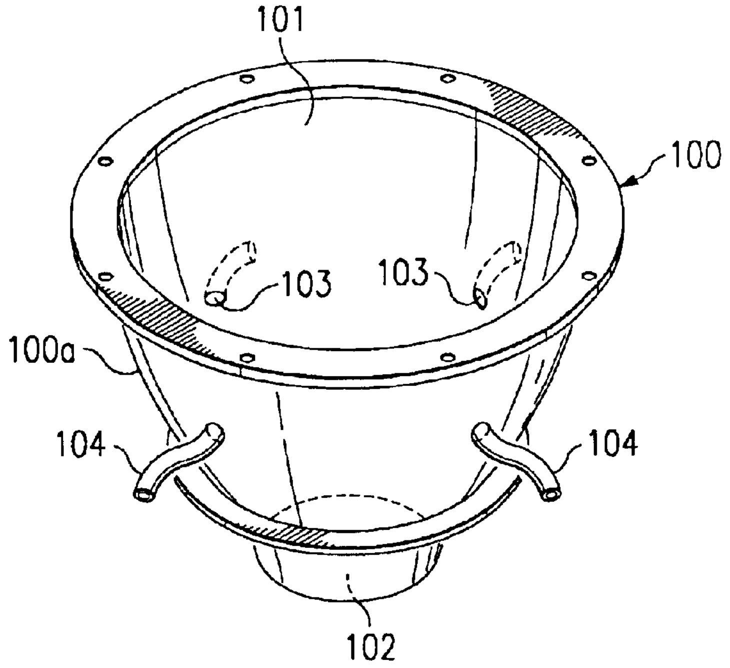
FIG. 2 is a perspective view of the container of FIG. 1.

FIG. 2 illustrates a detailed view of container 100, which as shown, has an inlet 101 and an outlet 102. Additionally, as shown in FIG. 2, container 100 can be of a conical shape with an increasingly narrowing width in a direction from inlet 101 to outlet 102. The shape of container 100 is not limited to a conical form however, and is only depicted in the present form as a representative example.

According to the illustrated embodiment of FIG. 2, container 100 is further provided with holes 103 defined through a sidewall 100*a* of container 100. A supply line 104 is connected to each of holes 103 and extends outwardly from the sidewall of container 100. Each supply line 104 is preferably provided between a reservoir (not shown) and container 100, and is used as a conduit to deliver a fluid coloring agent from the reservoir to an interior of container 100. Thus, according to the preferred embodiment of the present invention, a coloring agent can be supplied to container 100 from an external reservoir, through supply lines 104 and holes 103.

At the time of operation, a clay mixture that has been received by container 100 and which is being processed, is injected with a colorant of a specific color for a predetermined duration. According to such an arrangement, a colorant is added to the clay mixture before the clay mixture is ejected from container 100, coated with a layer of sand, and deposited in a brick molding box. This is unlike the previously described conventional forms of imparting a color to a brick wherein the colorant is generally added after the clay is extruded and the brick has taken shape. This feature of the present invention allows the colorant to effectively penetrate the clay, imparting the desired color and pattern onto the brick.

Figure 3A:
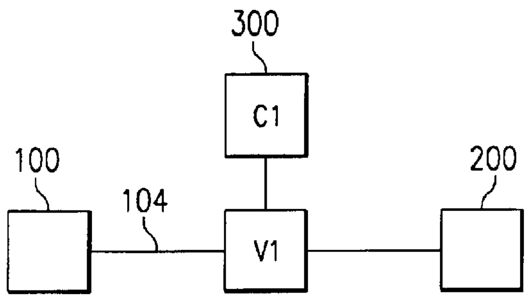
FIG. 3A is a block diagram of a supply system according to a first embodiment of the present invention.

FIG. 3A of the present invention shows a block diagram, representing an exemplary view of the supply system for the coloring agent. In this embodiment of the present invention, supply line 104 is in fluid communication with container 100 on one side and a reservoir 300 on another side with valve V1 positioned inline between container 100 and reservoir 300. Valve V1 is operationally connected to and controlled by a controller 200, and is in fluid communication with reservoir 300, which contains a coloring agent C1. According to this arrangement, reservoir 300 can supply a coloring agent C1 to container 100 through supply line 104 in accordance with the opening and closing operation of valve V1, which is controlled by controller 200.

The configuration described above, wherein a valve V1 provided between and a reservoir 300 and container 100, and controlled by controller 200 can be duplicated as many times as needed. That is, any number of reservoirs having different coloring agent supplies, along with valves, supply lines to container 100, and control lines to controller 200 can be added to the system by any number of arrangements. Thus, several configurations are possible. Further, the additional hardware is very simple and is merely an addition to a portion of the manufacturing process that is already in place, not a wholly separate and additional manufacturing step. Accordingly, additional expense is minimized, and the processing time for forming a brick is not lengthened further by the addition of the hardware and/or processing steps.

Figure 3B:
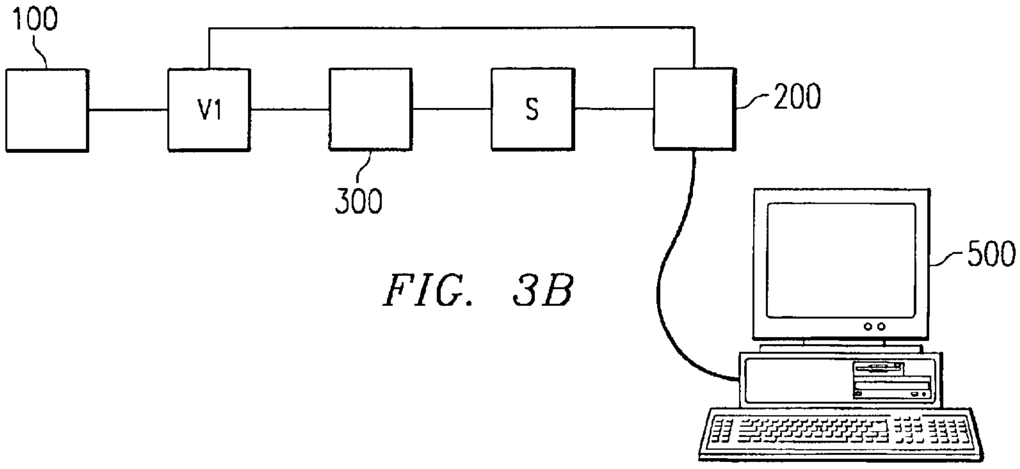
FIG. 3B is a block diagram of a supply system according to a second embodiment of the present invention.

FIG. 3B also illustrates a block diagram of the supply system of another embodiment of the present invention. In particular, in one aspect, the embodiment pictured in FIG. 3B differs from the embodiment pictured in FIG. 3A in that, according to FIG. 3B, controller 200 is connected to both valve V1 and reservoir 300. According to the presently illustrated embodiment, controller 200 can be connected to reservoir 300 via a sensor S. However, in other embodiments, controller 200 can be connected to reservoir 300 directly. Furthermore, as shown in FIG. 3B, a computerized workstation 500 connected to controller 200 can be added.

According to the embodiment illustrated in FIG. 3B, controller 200 is able to control the position of valve V1, and also determine a condition of reservoir 300 based on an input from sensor S. Sensor S can be used to detect a condition of a fluid level, for example, an amount, of coloring agent C1 in reservoir 300. Thus, for example, at a time when reservoir 300 is empty, an empty condition can be sensed and relayed to controller 200. Additionally, controller 200 can also be equipped to detect a malfunction of valve V1 and supply line 104 based on the sensed condition of reservoir 300. For example, if the fluid level of reservoir 300 changes at a time when valve V1 is indicated as being in a closed position, it can be determined that valve V1 and supply line 104 are malfunctioning and require attention. Similarly, if the fluid level of reservoir 300 is not changing at an appropriate rate, or not changing at all, at a time when valve V1 should be in an opened positioned, it can be determined that valve V1 and supply line 104 are malfunctioning and require attention.

With the addition of workstation 500, the operation of the fluid supply to the container 100 can be automated, or controlled by software programs. That is, each of the above-described operations can be stored in a memory of workstation 500, which can then be used to control the operation of the supply system. Further, workstation 500 can be used as an interface between a user and the supply system, i.e., storing the different color combinations and algorithms used to create different brick types having the different appearances, storing coloring supply time duration, error detection, alarm signaling, auto ON/OFF, etc. Moreover, controller 200, while displayed separately from workstation 500 can be provided onboard workstation 500, creating a controlling hub at workstation 500.

According to the above-described embodiments of the present invention, the repeatability and accuracy of the process of adding color to a brick is improved because the addition of a coloring agent to the clay mixture in container 100 can be both measured and accurate. Further, the different color combinations, supply amounts, and supply time periods which achieve different brick types, i.e., bricks having different appearances—unique color and patterns of color, can be stored and catalogued according to the brick type that will be produced. Therefore, whenever it becomes necessary to reproduce a previously produced brick having a specific color and pattern of color, it is only necessary to recall the stored information regarding the brick type, and retrieve the corresponding color combination and the necessary supply amounts for each coloring agent, in order to effect an accurate reproduction of the brick.

Figure 3C:
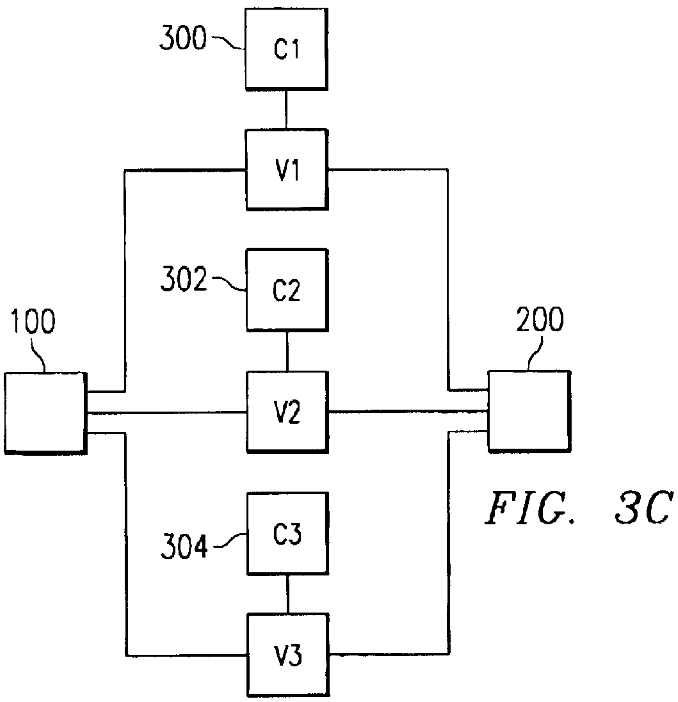
FIG. 3C is a block diagram of a supply system according to a third embodiment of the present invention.

Many variations of the above-described invention are possible. For example, container 100 can be one of many containers which form an automated array of extruders. Accordingly, the supply system array can be redundant for each container 100. Also, each container 100 forming the array can be used to produce a brick having a different color, if necessary. Specifically, as in the embodiment depicted in FIG. 3C, each container 100 can be supplied with coloring agents C1, C2, and C3 from each of reservoirs 300, 302, and 304, respectively, wherein each of coloring agents C1, C2, and C3 represents a different color. Further, reservoir 300 can be connected to container 100 for fluid communication through valve V1, likewise, reservoir 302 can be connected to container 100 through valve V2, and reservoir 304 can be connected to container 100 through valve V3. According to such arrangement, controller 200 can then be operably connected to each of valves V1, V2, and V3 to control the amount of each coloring agent entering container 100. Alternatively, separate controllers can be used to control different coloring agent supplies.

Accordingly, a number of bricks, each having different colors and different color patterns, can be produced simultaneously using multiple supply lines, each supplying a different color. Moreover, the color combinations and configurations can be changed or adjusted quite simply by rearrangement of the coloring agent supply as needed. In addition, it is also acceptable to combine workstation 500 with the system illustrated in FIG. 3C, to perform the same functions and operations described with reference to FIG. 3B.

Figure 4A:
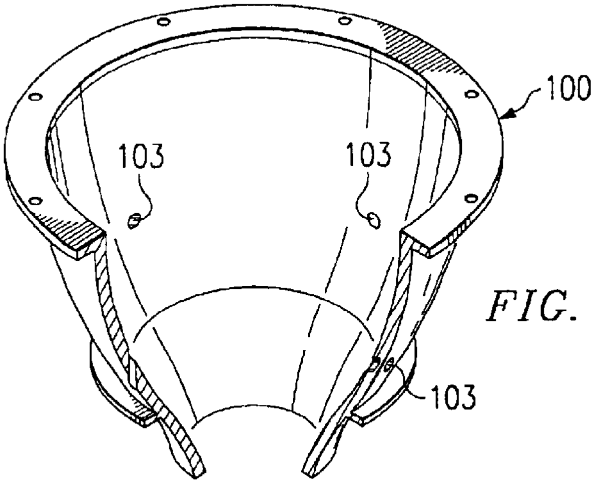
FIGS. 4A and 4B are cross-sectional views of a container according to an alternative embodiment of the present invention wherein an opening angle of holes entering the container can vary.
Figure 4B:
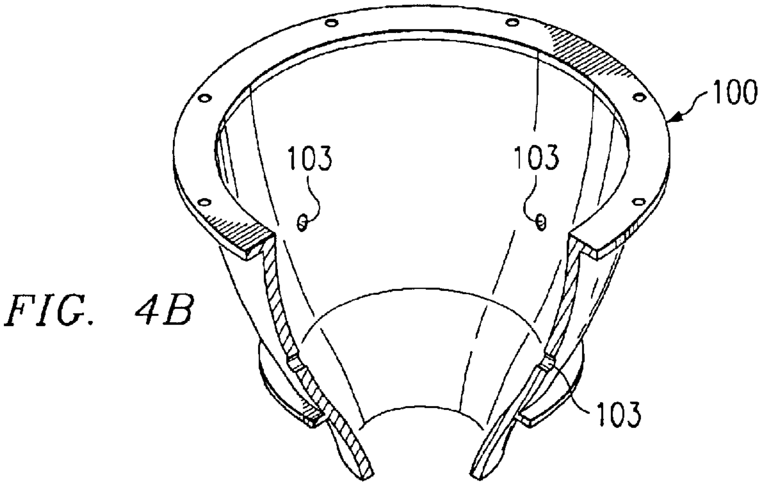
Figure 5A:
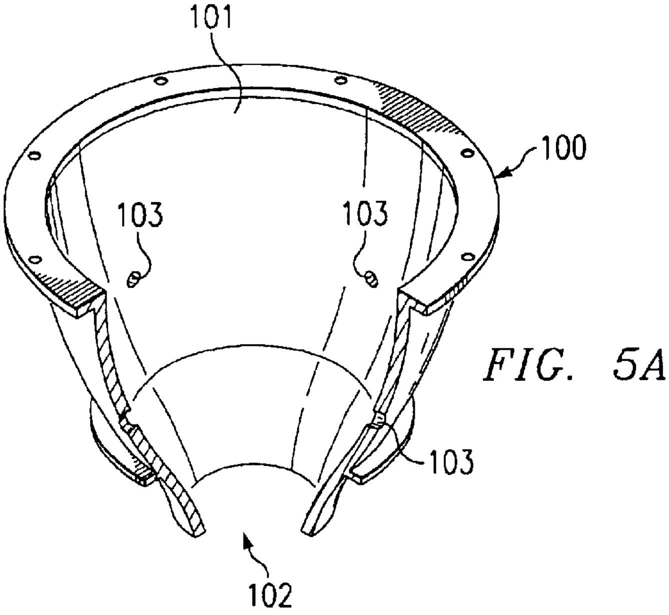
FIGS. 5A and 5B are cross-sectional views of a container according to an alternative embodiment of the present invention wherein a location of holes entering the container can vary.
Figure 5B:
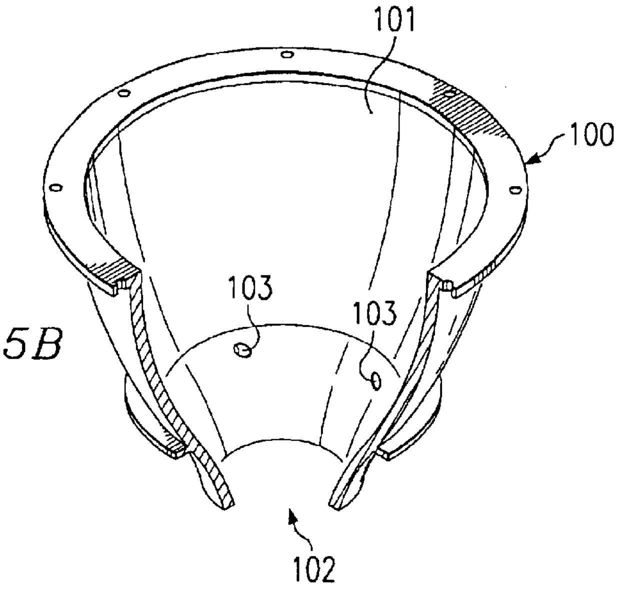

Further, no limitations have been given to the physical attributes of holes 103 into container 100, as many variations are possible without a departure from the invention. For example, the holes can be provided to open into the interior of container 100 at many different angles. FIG. 4A illustrates holes 103 opening into container 100 at a non-perpendicular angle relative to a surface of sidewall 100*a*, whereas FIG. 4B illustrates holes 103 opening into container 100 at a perpendicular angle relative to a surface of sidewall 100*a*. In another embodiment, holes 103 are positioned closer to inlet 101 than to outlet 102, as shown in FIG. 5A, or conversely, closer to outlet 102 than to inlet 101, as shown in FIG. 5B. It is also acceptable to position holes 103 in a middle portion of container 100.

By providing holes 103 at different positions of container 100, it is possible to provide varying amounts and different patterns of coverage of a coloring agent. For instance, when holes 103 are positioned at a lower position of container 100, as shown in FIG. 5B, the coloring agent entering through holes 103 covers a smaller area when it is released into container 100.

Similarly, advantages can also be gained by varying the angle at which holes 103 enter container 100. For example, when holes 103 are provided at a non-perpendicular angle, a coloring agent can enter container 100 tangentially relative to an interior surface of sidewall 100*a*. Thus, the velocity and pressure of the coloring agent being injected into container 100 can be increased without harming the clay material.

Figure 6:
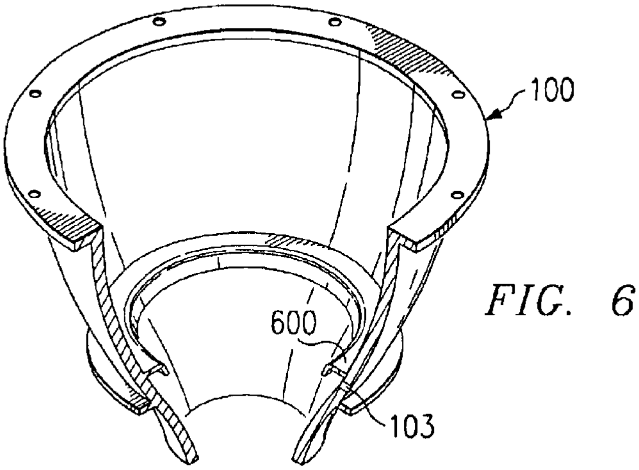
FIG. 6 is a cross-sectional view of a container according to an alternative embodiment of the present invention wherein a pressure lip is provided on an interior surface of the container.

In yet another embodiment, which is illustrated in FIG. 6, holes 103 are provided beneath a pressure lip 600 defined by a protruding rim structure that encircles an interior surface of sidewall 100*a* of container 100. The presence of pressure lip 600 creates a pressure drop beneath pressure lip 600 allowing the injected coloring agent, which enters container 100 at a position proximate to pressure lip 600, to flow around container 100. Pressure lip 600, according to the depiction in FIG. 6, is formed by a ledge which protrudes from an interior surface of sidewall 100*a* outwardly toward an interior of container 100. Other variations are possible, for example, a directional lip, a curved lip, or the lip may encircle only a portion of container 100.

Figure 7:
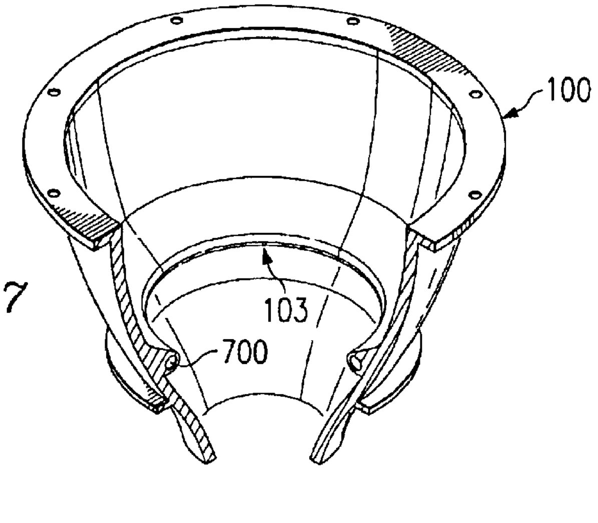
FIG. 7 is a cross-sectional view of a container according to an alternative embodiment of the present invention wherein an injection ring is provided on an interior surface of the container.

Alternatively, holes 103 can be formed in another variation of a protruding rim structure, herein an injection ring 700, that is formed on an interior surface of sidewall 100*a* of container 100 and encircles container 100. This embodiment is depicted in FIG. 7. Use of injection ring 700 provides the advantage of even clay coverage because the number of holes 103 where a coloring agent can enter container 100 can be increased. Injection ring 700 is formed by a ring formed around an interior surface of sidewall 100*a*. A coloring agent is injected into a continuous fluid chamber in injection ring 700 through holes (not shown) in sidewall 100*a* and exits the injection ring 700 through holes 103 at a front surface of injection ring 700. As will be understood, the continuous fluid chamber in injection ring 700 can be segmented or partitioned as needed to accommodate the appropriate number of coloring agents entering container 100.

Thus, according to the alternative embodiments described above, any number of variations and combinations are possible. Further, the supply system described above can be of any number of designs, including electrical type, hydraulic type, or pneumatic type. Additionally, as previously stated the shape of container 100 can vary. Similarly, the diameter of holes 103 and supply lines 104 are not subject to any size restrictions.

Although the present invention has been described with reference to a presently preferred embodiment, it will be appreciated by those skilled in the art that various modifications, alternatives, variations, and substitution of parts and elements, may be made without departing from the spirit and scope of the invention as defined in the appended claims.

What is claimed is:

1. An apparatus for adding a coloring agent to material for brick making comprising:

an extrusion container having a hole defined in a sidewall thereof;

a coloring agent supply having an outlet port adapted to open into said extrusion container through said hole in said sidewall of said extrusion container;

a storage device which stores a coloring agent supply amount data corresponding to a supply amount for each of a plurality of brick types, each of said plurality of brick types having a different appearance; and a controller adapted to control a supply of a coloring agent from said coloring agent supply into said extrusion container in accordance with a selected brick type.

2. An apparatus according to claim 1 wherein said extrusion container has an inlet and an outlet and said hole is provided at a position closer to said outlet of said extrusion container than said inlet of said extrusion container.

3. An apparatus according to claim 2 wherein said coloring agent supply further comprises a valve for controlling a fluid flow of said coloring agent to said extrusion container in said supply line.

4. An apparatus according to claim 1 wherein said extrusion container is conical.

5. An apparatus according to claim 1 wherein said coloring agent supply comprises a reservoir containing a coloring agent and a supply line providing fluid communication between said extrusion container and said reservoir.

6. An apparatus according to claim 1, further comprising a computer in data communication with said controller.

7. An apparatus according to claim 6 wherein said storage device is a memory in said computer.

8. An apparatus according to claim 1, further comprising:

a protruding rim structure on an interior of the extrusion container above said hole opening into said container.

9. An apparatus as claimed in claim 8 wherein said protruding rim structure is a pressure lip, and said hole is defined by a plurality of space openings into the container proximate to said pressure lip.

10. An apparatus according to claim 1, further comprising an injection ring fluid chamber with openings communicating into said fluid chamber.

11. An apparatus according to claim 1, further comprising a plurality of injection holes which open into said container and through which said coloring agent enters said container.

12. An apparatus according to claim 1, further comprising more than one hole which opens into said container, each supplying a different coloring agent into said container.

13. An apparatus according to claim 1, further comprising a segmented injection ring inside said container, each segment receiving a different coloring agent for introduction into the container.

14. An apparatus for adding a coloring agent to material for brick making comprising:

an extrusion container having an opening defined in a sidewall thereof;

a coloring agent supply communicating with said opening for delivery of the coloring agent to the interior of the container as brick making material passes through the container;

a sensor which senses a condition of at least a portion of said coloring agent supply and outputs a result;

a controller which receives an output of said sensor and determines an operational condition of said coloring agent supply based on said output of said sensor, and controls a supply of a coloring agent into said extrusion container in accordance with a selected brick type.

15. An apparatus according to claim 14 wherein said extrusion container has an inlet and an outlet and said opening is provided at a position closer to said outlet of said extrusion container than said inlet of said extrusion container.

16. An apparatus according to claim 14 wherein said extrusion container is conical.

17. An apparatus according to claim 14, further comprising a plurality of injection openings into said container and through which said coloring agent enters said container.

18. An apparatus according to claim 14, further comprising more than one opening into said container, each supplying a different coloring agent into said container.

19. An apparatus according to claim 14, further comprising:

a plurality of openings in the sidewall of said container for delivery of the coloring agent to the interior of the container as brick making material passes through the container, and a protruding rim structure provided on an interior of the extrusion container above said openings into said container.

20. An apparatus according to claim 19 wherein said protruding rim structure is a pressure lip, and said openings are provided at a position proximate to said pressure lip.

21. An apparatus according to claim 20 wherein said protruding rim structure defines an injection ring fluid chamber container for delivery of the coloring agent to the interior of said container.

22. An apparatus according to claim 21 wherein said injection ring is segmented, with each segment receiving a different coloring agent for introduction into said container.

23. A system for adding a coloring agent to material for brick making comprising:

an extrusion container having a hole defined in a sidewall thereof;

a coloring agent supply having an outlet port adapted to open into said extrusion container through said hole in said sidewall of said extrusion container;

a sensor which senses a condition of at least a portion of said coloring agent supply and outputs a result;

a storage device which stores a coloring agent supply amount data corresponding to a supply amount for each of a plurality of brick types, each of said plurality of brick types having a different appearance; and a controller which receives an output of said sensor and determines an operational condition of said coloring agent supply based on said output of said sensor, and controls a supply of a coloring agent into said extrusion container in accordance with a selected brick type.

24. A system according to claim 23, further comprising a plurality of injection holes opening into said container and through which said coloring agent enters said container.

25. A system according to claim 23, further comprising more than one hole opening into said container, each supplying a different coloring agent into said container.

26. A system according to claim 23 wherein said coloring agent supply comprises a reservoir containing a coloring agent and a supply line providing fluid communication between said extrusion container and said reservoir.

27. A system according to claim 26 wherein said coloring agent supply further comprises a valve for controlling a fluid flow of said coloring agent to said extrusion container in said supply line.

28. A system according to claim 27 wherein said sensor senses a condition of a coloring agent amount in said reservoir.

29. A system according to claim 28 wherein said controller determines an operational condition of said valve based on an output of said sensor.

30. A system according to claim 23, further comprising a computer in data communication with said controller.

31. A system according to claim 23 wherein said storage device is a memory in said computer.

32. A system according to claim 23, further comprising:

a plurality of holes defined in the sidewall of said container, and a protruding rim structure provided on an interior of the extrusion container above said holes opening into said container.

33. A system according to claim 32 wherein said protruding rim structure is a pressure lip, and said holes are provided at a position proximate to said pressure lip.

34. A system according to claim 33 wherein said protruding rim structure defines an injection ring fluid chamber, said holes opening out of said fluid chamber.

35. A system according to claim 34 wherein said injection ring is segmented, with each segment receiving a different coloring agent for introduction into the container.

* * * * *